United States Patent [19]

Link et al.

[11] Patent Number: 4,696,223
[45] Date of Patent: Sep. 29, 1987

[54] PNEUMATIC PRESSURE ACTUATOR

[75] Inventors: Charles T. Link, Pleasant Hills; Bennie M. Gray, Pittsburgh; Harold L. Shumaker, Monroeville, all of Pa.

[73] Assignee: American Standard Inc., Pittsburgh, Pa.

[21] Appl. No.: 274,956

[22] Filed: Jun. 18, 1987

Related U.S. Application Data

[63] Continuation of Ser. No. 105,325, Dec. 19, 1978, abandoned.

[51] Int. Cl.$^4$ .......................................... F01B 31/00
[52] U.S. Cl. ..................... 92/86.5; 92/118; 92/156; 92/159; 92/168; 92/170; 92/210; 92/243
[58] Field of Search ............... 92/156, 158, 159, 169, 92/170, 171, 208, 210, 212, 221, 243, 250, 251, 86.5, 118, 168

[56] References Cited

U.S. PATENT DOCUMENTS

| | | | |
|---|---|---|---|
| 2,004,669 | 6/1935 | Miller | 92/158 |
| 2,089,823 | 8/1937 | Bone | 188/62 |
| 2,184,871 | 12/1939 | Bone | 188/62 |
| 2,840,428 | 6/1958 | Browall | 92/159 |
| 3,040,712 | 6/1962 | Harrah | 92/170 |
| 3,055,720 | 9/1962 | Price | 92/240 |
| 3,695,149 | 10/1972 | Eberhart | 92/170 |
| 3,696,714 | 10/1972 | Panigati | 92/170 |
| 3,703,125 | 11/1972 | Pauliukonis | 92/170 |
| 4,140,442 | 2/1979 | Mulvey | 92/156 |
| 4,207,807 | 6/1980 | Takata | 92/170 |

FOREIGN PATENT DOCUMENTS

| | | | |
|---|---|---|---|
| 2245627 | 3/1974 | Fed. Rep. of Germany | 92/170 |
| 2,842016 | 4/1979 | Fed. Rep. of Germany | 92/250 |
| 2232234 | 12/1974 | France | 92/170 |
| 563401 | 8/1944 | United Kingdom | 92/170 |

Primary Examiner—Abraham Hershkovitz
Attorney, Agent, or Firm—J. B. Sotak

[57] ABSTRACT

A pneumatic pressure actuator including a cylinder assemblage having a pair of metallic cylinder heads and a fiberglass cylinder casing held together by a plurality of tie bolts and nuts. A piston and piston rod reciprocally movable within the cylinder assemblage and including a greased nylon cushion ring and polyurethane wiper ring for reducing frictional wear between the relatively movable surfaces.

2 Claims, 3 Drawing Figures

PNEUMATIC PRESSURE ACTUATOR

This is a continuation of application Ser. No. 105,325, filed Dec. 19, 1979 and now abandoned.

FIELD OF THE INVENTION

This invention relates to an improved fluid pressure motor and more particularly to a novel high power pneumatically operated piston cylinder unit employing a pair of cast heads and a moly-disulfide fiberglass casing held together by a plurality of tie bolts and a short stroke reciprocating piston having a lubricated nylon cushion ring for reducing abrasive wear between the piston and fiberglass casing and having a polyurethane piston rod wiper ring for reducing wear on the piston rod sleeve bearing.

BACKGROUND OF THE INVENTION

In a gravity-type of railroad classification yard, it is common practice to employ power operated braking apparatus, such as, hump and group frictional car retarders, to control the speed of the free-rolling cars as they move toward their given destinations in the various classification tracks. In practice, the railway car retarders employ a pair of braking elements, such as, brake beams and shoes or braking bars which are disposed parallel and on opposite sides of the track rail and which are movable between an opened nonbraking position and a closed braking position by a plurality of operating units. The operating units are substantially identical in construction and include a pair of pivotal levers which carry the braking elements. Each of the operating units includes a fluid pressure motor having a piston and cylinder for causing the pivotal levers to move the brake elements between the opened braking and closed nonbraking positions. Previously, the piston cylinder pressure motor was an extremely heavy assemblage which was very expensive to manufacture due to the excessive amount of machining that was required in making the cylinder member. In addition, the clyinder wall was susceptible to excessive wear and scoring which required the replacement of the cylinder member or the turning down of the interior surface of the cylinder wall. In either case, the frequent rebuilding of the fluid motors was not only costly in terms of machining or replacing the cylinders but also expensive from the standpoint of frequency of repair of the car retarder actuators. Further, it has been long recognized that it would be highly advantageous to effectively reduce the weight and overall cost of the fluid pressure motors. However, the high power handling requirements and the exigency to function properly under adverse environmental conditions have seriously deterred any significant changes or modifications in the basic design and construction of the conventional fluid pressure motors. Thus, it is essential that any proposed ramification must meet or exceed the long-standing criteria which has been established and expected of fluid motors for car retarders.

OBJECTS AND SUMMARY OF THE INVENTION

Accordingly, it is an object of this invention to provide a new and improved fluid pressure motor which is lighter in weight than heretofore.

Another object of this invention is to provide a unique pneumatic pressure actuator which is less costly due to reduced machining operations.

A further object of this invention is a novel high power fluid actuator employing a cylinder assemblage having a pressure and nonpressure head and a plastic cylinder case held together by a plurality of tie bolts for allowing quick disassembly and assembly or rebuilding.

Yet another object of this invention is to provide a lightweight high pressure fluid motor having improved lubricating qualities for reducing the frictional wear between the piston and cylinder members.

Yet a further object of this invention is to provide a new and unique short stroke pneumatic pressure motor which requires less periodic maintenance and has an extended life.

Still a further object of this invention is to provide a fluid motor having a cylinder assemblage and a metallic piston, the cylinder assemblage including a top header casing having an externally accessible pivotal bearing, a bottom header casting, a moly-disulfide fiberglass cylinder casing securely fastened between the top and bottom header casing by a plurality of tie bolts, and a piston rod passing through a bore, bearing bushing, and a piston rod wiper located in the bottom header casing for permitting the metallic piston to reciprocate in the moly-disulfide fiberglass cylinder casing, and a nylon cushion ring and packing cup fitted into annular peripheral grooves formed in the metallic piston to prevent the metallic piston from contacting the moly-disulfied fiberglass cylinder casing.

Still another object of this invention is to provide a novel and unique high power pneumatic pressure actuator which is economical in cost, simple in construction, dependable in service, durable in use, easy to maintain, and efficient in operation.

There is shown a fluid pressure operated motor or actuator including a cylinder assemblage and a reciprocating piston. The cylinder assemblage includes a top metallic header casting, a bottom metallic header casting, and a moly-disulfied fiberglass cylinder casing securely held together by a plurality of tie bolts. The reciprocating piston includes a piston head and a piston rod which pass through a sleeve bearing situated in the bottom metallic header casting. A polyurethane wiper ring is disposed at the outer extremity of the sleeve bearing for cleaning the piston rod. The piston head includes a grooved nylon cushion ring situated in an annular shoulder and held in place by a rubber packing cup and a piston follower ring which is bolted to the piston head. A grease fitting and a diametrically opposed petcock are screwed into the fiberglass cylinder casing for lubricating the grooved nylon cushion ring. An external pivotal bearing is provided on the top metallic header casting and on the end of the piston rod.

BRIEF DESCRIPTION OF THE DRAWINGS

The above objects and other attendant advantages of the present invention will become more readily apparent from the following detailed description when analyzed and considered in conjunction with the accompanying drawings wherein.

DESCRIPTION OF THE INVENTION

Figure 1:
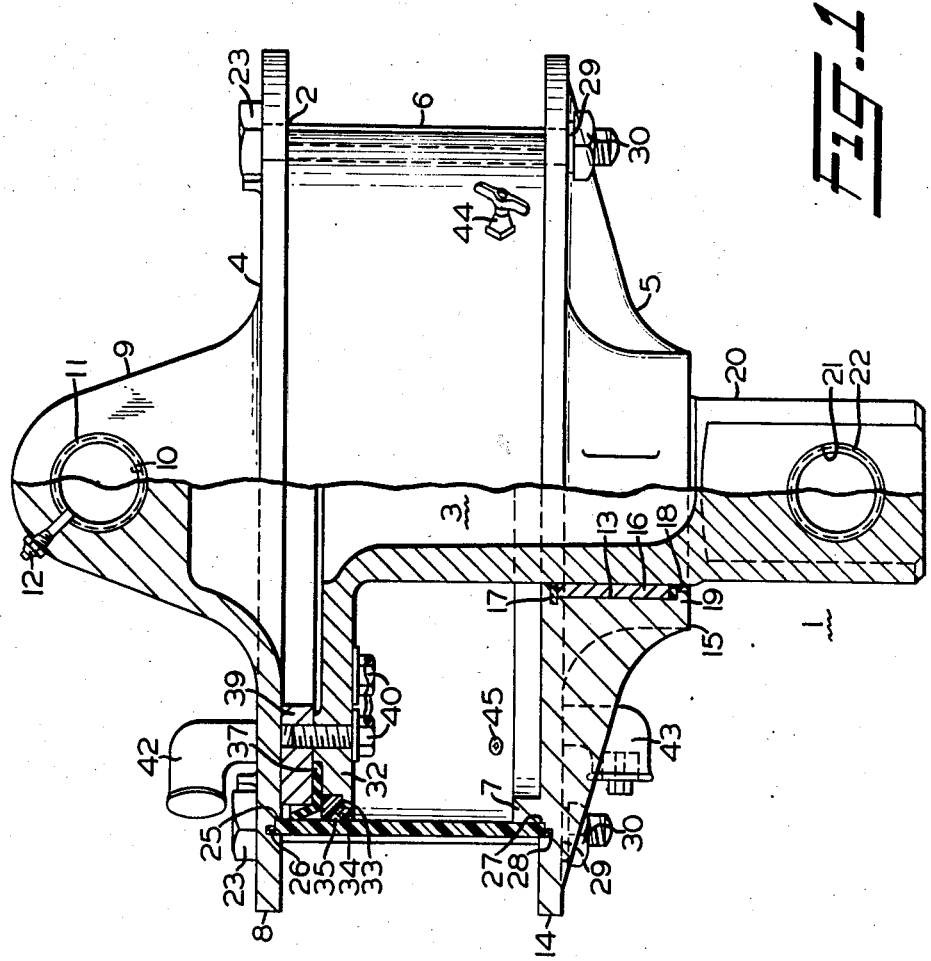
FIG. 1 is a side elevational view partly in section of the pneumatic pressure actuator or motor in accordance with the present invention.

Referring now to the drawings, and in particular to FIG. 1, there is shown an air or fluid pressure actuator which is generally characterized by numeral 1. the pneumatic motor or actuator 1 includes a cylinder assemblage 2 and a reciprocally movable piston 3.

Figure 3:
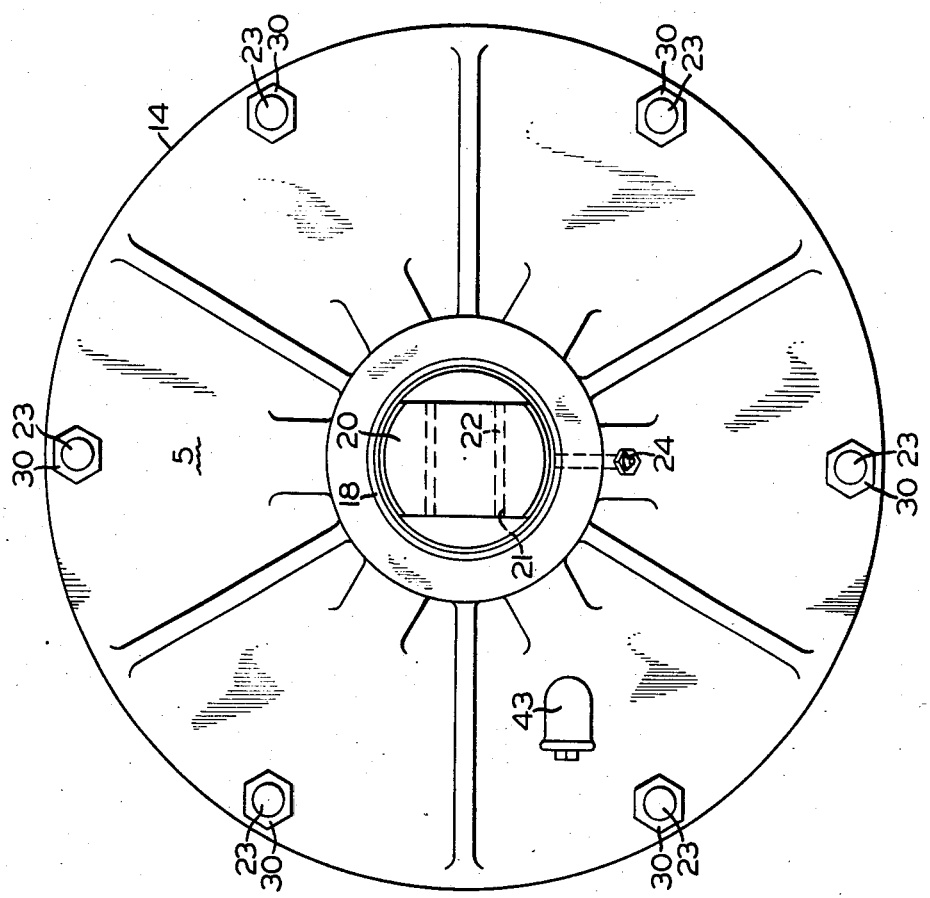
FIG. 3 is a bottom end view of the pneumatic pressure motor of FIG. 1.
Figure 2:
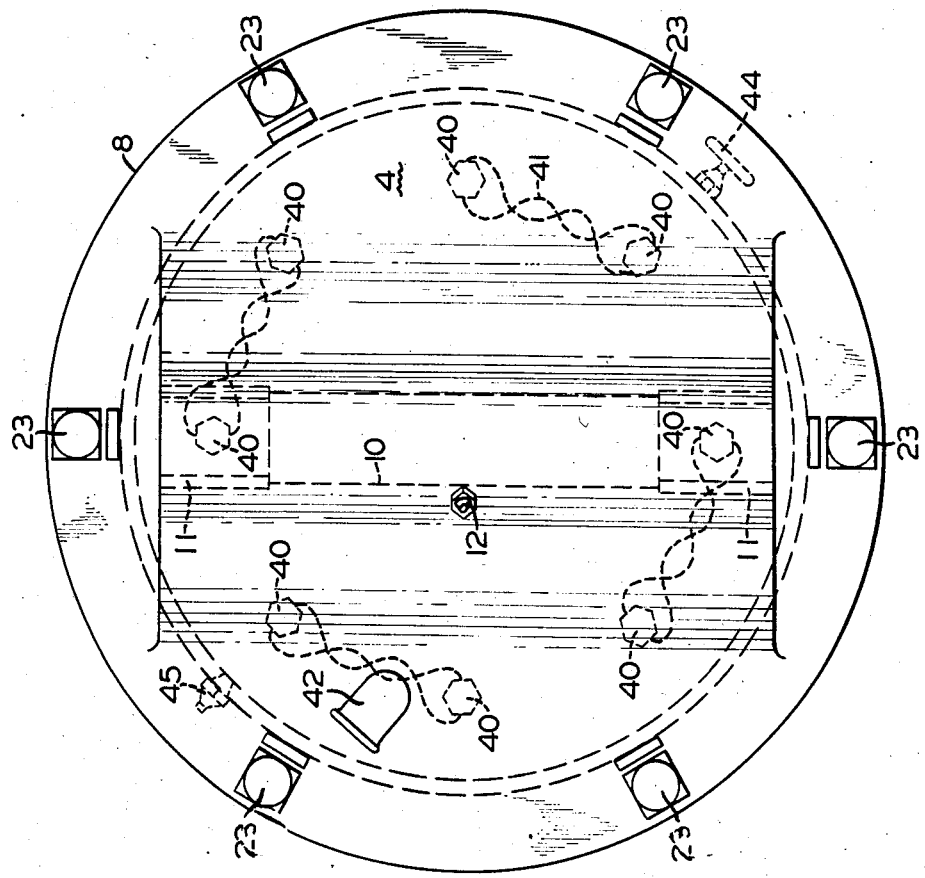
FIG. 2 is a top end view of the pneumatic pressure motor of FIG. 1.

The cylinder assemblage 2 comprises a pair of metallic cylinder heads or header castings 4 and 5 and a molydisulfide fiberglass cylindrical casing or tube 6. As shown in FIGS. 1 and 2, the top header casting 4 includes an annular flange portion 8 and an upstanding trunnion portion 9 which includes a through bore 10. A pair of sleeve bearings 11 and 11' are pressed into the respective ends of bore 10 to provide a pivotal connection for the free bifurcated end of an upper lever member of a frictional car retarder. A grease fitting 12 is threaded into a passageway which communicates with bore 10 to permit the greasing of the pivotal bearings. The bottom header casting 5 includes an annular portion 14, a stop ring 7, and a spidered hub portion 15. The hub 15 includes a central opening or bore 13 for receiving a bushing or sleeve bearing 16 which is held and locked into position by a split retaining ring 17. As shown in FIG. 1, a polyurethane (which is a high abrasion resistant material) wiper ring 18 is situated at the outer edge of the central bore 13 of hub 15. The wiper ring 18 is trapped between the outer face of the bearing 16 and an annular lip 19 formed at the outer edge of bore 13. The piston 3 includes an integrally formed piston rod 20 which is slidably guided by sleeve bearing 16 and has a through bore 21 formed in the exteriorly extending portion. It will be seen that sleeve bearing 22 is pressed into bore 21 for providing a pivotal connection for the free end of a lower leaver of the car retarder. As shown in FIG. 3, a grease fitting 24 is screwthreaded into a hole formed in the hub of the casting 5 to allow for lubrication of bearing 16. The piston 3 is operatively disposed within the tubular casing 6 which is held in fixed relationship between heads 4 and 5 by a plurality of tie bolts 23. As shown in FIG. 1, the upper end of plastic tube 6 is fitted into an annular axial groove 25 having a rubber O-ring seal 26. Similarly, the lower end of plastic tube 6 is situated in an annular axial groove 27 having a rubber O-ring seal 28. Thus, the tie bolts 23, washers 29, and nuts 30 securely clamp the plastic cylinder tube or casing 6 between the header castings 4 and 5 to form a sturdy integral cylinder structure. It will be observed that piston 3 includes an enlarged head portion 32 which moves and reciprocates within the cylinder 2. The periphery of head 32 includes a stepped flange 33 which accommodates a nylon cushion or buffer ring 34 having a V-shaped annular notch or groove 35 formed in the outer surface or periphery thereof, the purpose of which will be described in greater detail hereinafter. Further, a rubber packing cup 37 is disposed in an annular shoulder formed in the top surface of piston head 32. The packing cup 37 and the nylon buffer ring 34 are trapped and securely held in place by a piston follower ring 39 which is secured by a plurality of bolts 40. The heads of bolts 40 are safety wired together in pairs by wires 41 to prevent loosening and unthreading of the fastening bolts 40. As shown in FIGS. 1 and 2, an inlet pressure supply fitting is screwed onto a threaded opening formed in the top header casting 4 for connection to a suitable source of pneumatic or air pressure (not shown). In viewing FIGS. 1 and 3, it will be seen that an exhaust or vent pipe fitting 43 is screwed into a threaded opening formed in the bottom casting 5. Further, a petcock 44 and a diametrically opposed grease fitting 45 are threaded into openings formed in the periphery surface of fiberglass casing 6. In practice, the piston is moved downward to its fully extended position so that the underside of the piston head 32 engages the stop ring 7. In this extended position, the V-groove 35 of the nylon cushion ring 34 is in alignment with the grease fitting 45 and petcock 44. After opening the petcock 44, suitable lubricant or grease is forced into fitting 45 until such time as grease comes out of the top of the petcock 44 which indicates that the V-groove 35 is full so that the petcock 44 is then closed and the grease gun or the like is removed from fitting 45. The lubricant or grease assists in reducing wear as well as aids in providing a better seal between the piston and cylinder. In actuality, the piston and cylinder are greased after being completely assembled by the manufacturer and, thereafter, are periodically greased during regular maintenance periods in the field.

In operation, when fluid pressure from the pressure source is admitted through inlet 42 to the fluid motor, the piston is forced downwardly, as viewed in FIG. 1, with the air under the piston being exhausted through a hole in the plug pipe fitting 43. It will be seen that the nylon cushion ring 34 minimizes the frictional wear of the inner wall of the plastic cylinder casing 6 and that under no circumstance does the metallic piston 3 contact the casing 6. Further, the packing cup 37 maintains a good seal between the inner wall of cylinder casing 6 so that little, if any, blow-by will occur during the downward piston stroke. After the source of pressure is removed from the inlet 43, the piston 3 is returned or moved upwardly by the upper and lower levers of the car retarder which are normally biased to have their respective ends move together by gravity and/or spring return means. It will be seen that the wiping action of the polyurethane ring 18 cleans the piston rod 20 during its retractions so that dirt, grit, or any foreign material is prevented from entering the sleeve bearing 16 thereby reducing the possibility of premature failure. Further, it will be appreciated that the fluid actuator 1 may be rebuilt with a minimum amount of time and effort. The pneumatic motor 1 may be quickly disassembled or broken down and any worn parts, such as, bearings, rings, casings, etc., may be facilely replaced, reassembled more quickly, and less costly than heretofore possible. It will be appreciated that the plastic casing 6 materially reduces the overall weight of the motor 1. Further, it will be observed that the upper casting 9 and the piston 3 are hollowed out to lessen the mass of the piston cylinder actuator 1.

It will be understood that various changes, modifications, and alterations may be made to the illustrated and described embodiment without departing from the spirit and scope of the present invention. Therefore, it is intended that all of the subject matter contained in the foregoing description or shown in the accompanying drawings should be interpreted as illustrative and not in a limiting sense. Thus, various substitutions and changes will undoubtedly occur to those skilled in the art, which will fall without the purview of the present invention and will be encompassed within the meaning of the appended claims.

Having now described the invention, what we claim as new and desire to secure by Letters Patent, is:

1. A short stroke fluid motor comprising, a cylinder assemblage and a metallic piston having an enlarged head portion formed on one end and having a piston rod integrally formed on the other end, said cylinder assemblage including a metallic top header casting, a metallic bottom header casting, and an all-plastic cylinder casing fixedly secured between said top and bottom header castings, said top header casting and said enlarged head portion of said metallic piston being hollowed out to lessen the mass of the fluid motor, said piston rod passing through a bore located in said bottom header casting for permitting said metallic piston to reciprocate in said plastic cylinder casing, a cushion ring carried by said enlarged head portion of said hollow metallic piston, said cushion ring includes a grease accommodating V-groove facing the inner wall of said plastic cylinder to reduce wear and to provide a better seal between said piston and said cylinder and to prevent said enlarged head portion from contacting said plastic cylinder casing, and said plastic cylinder casing is made of moly-disulfied fiberglass material.

2. A short stroke fluid motor comprising, a cylinder assemblage and a metallic piston having an enlarged head portion formed on one end and having a piston rod integrally formed on the other end, said cylinder assemblage including a metallic top header casting, a metallic bottom header casting, and an all-plastic cylinder casing fixedly secured between said top and bottom header castings, said top header casting and said enlarged head portion of said metallic piston being hollowed out to lessen the mass of the fluid motor, said piston rod passing through a bore located in said bottom header casting for permitting said metallic piston to reciprocate in said plastic cylinder casing, a cushion ring carried by said enlarged head portion of said hollow metallic piston, said cushion ring includes a grease accommodating V-groove facing the inner wall of said plastic cylinder to reduce wear and to provide a better seal between said piston and said cylinder and to prevent said enlarged head portion from contacting said plastic cylinder casing, and a grease fitting and petcock are provided on the outside of said plastic cylinder casing to permit the lubricating of said cushion ring.

* * * * *

UNITED STATES PATENT AND TRADEMARK OFFICE
CERTIFICATE OF CORRECTION

PATENT NO. : 4,696,223
DATED : September 29, 1987
INVENTOR(S) : Charles T. Link, Bennie M. Gray, and Harold L. Shumaker It is certified that error appears in the above-identified patent and that said Letters Patent are hereby corrected as shown below:

Cover page of the Official Patent Grant, preceding the drawing sheets, delete the filed date of "June 18, 1987" and insert the correct filed date of --June 18, 1981--

Column 5, lines 22-23, delete "moly-disulfied" and insert --moly-disulfide--

Signed and Sealed this

Third Day of May, 1988

Attest:

DONALD J. QUIGG

Attesting Officer

Commissioner of Patents and Trademarks